(12) United States Patent
Visser

(10) Patent No.: US 11,490,573 B2
(45) Date of Patent: Nov. 8, 2022

(54) CONTAINER, SUCH AS A TRAY OR STRIP, WITH CUTTING EDGES

(71) Applicant: VISSER 'S-GRAVENDEEL HOLDING B.V., s-Gravendeel (NL)

(72) Inventor: Anthony Visser, s-Gravendeel (NL)

(73) Assignee: VISSER 'S-GRAVENDEEL HOLDING B.V., 's-Gravendeel (NL)

( * ) Notice: Subject to any disclaimer, the term of this patent is extended or adjusted under 35 U.S.C. 154(b) by 187 days.

(21) Appl. No.: 16/962,705

(22) PCT Filed: Jan. 22, 2019

(86) PCT No.: PCT/NL2019/050034
§ 371 (c)(1),
(2) Date: Jul. 16, 2020

(87) PCT Pub. No.: WO2019/143248
PCT Pub. Date: Jul. 25, 2019

(65) Prior Publication Data
US 2020/0352109 A1    Nov. 12, 2020

(30) Foreign Application Priority Data
Jan. 22, 2018   (NL) .................................... 2020300

(51) Int. Cl.
*A01G 9/02*     (2018.01)
*A01G 9/029*    (2018.01)
*A01G 2/10*     (2018.01)

(52) U.S. Cl.
CPC ............. *A01G 9/0295* (2018.02); *A01G 2/10* (2018.02); *A01G 9/0291* (2018.02); *A01G 9/0299* (2018.02)

(58) Field of Classification Search
CPC ...... A01G 9/0295; A01G 2/10; A01G 9/0299; A01G 9/0291; A01G 9/0293; A01G 9/81;
(Continued)

(56) References Cited

U.S. PATENT DOCUMENTS

| 4,050,188 A | 9/1977 | van Wingerden |
| 5,131,185 A | 7/1992 | Wingerden |

(Continued)

FOREIGN PATENT DOCUMENTS

| CN | 106472148 A | 3/2017 | |
| CN | 107409833 A * | 12/2017 | ........... A01G 9/0291 |

(Continued)

OTHER PUBLICATIONS

Machine translation of FR 2210341 to Bayer. (Year: 1974).*
International Search Report and Written Opinion, Application No. PCT/NL2019/050034, dated Jul. 5, 2019, 13 pages.

*Primary Examiner* — Kathleen I Alker
(74) *Attorney, Agent, or Firm* — KDB Firm PLLC

(57) ABSTRACT

A container, such as a pot, strip or tray, comprising at least one accommodation for at least one specimen from a group, comprising: plants; seeds; seedlings; cuttings and the like, where the accommodation is configured to be filled with a substrate and the container exhibits at least a side wall, a bottom and a top surface to accommodate the substrate and the specimen in the substrate, of which at least a portion of the top surface is open to enable growth of the specimen there through in a longitudinal direction. The side wall includes a completely open passage which is dimensioned for inserting or extracting a block of substrate with essentially a full size of an interior of the accommodation into or from the interior through the passage in a sideways direction relative to the longitudinal direction, where at least the side wall includes a cutting edge alongside the passage.

13 Claims, 5 Drawing Sheets

(58) Field of Classification Search
CPC .......... A01G 9/088; A01G 9/08; A01G 9/029; A01G 9/0297; A01G 24/44; A01G 24/60; A01G 31/00; A01G 9/081; A01H 4/003
USPC .......... 47/86, 77, 73, 66.1, 66.2, 66.3, 66.4, 47/66.5, 59 S, DIG. 3
See application file for complete search history.

(56) References Cited

U.S. PATENT DOCUMENTS

| | | | | |
|---|---|---|---|---|
| 5,573,558 A | * | 11/1996 | Huang | A01C 11/02 |
| | | | | 47/1.01 R |
| 6,546,670 B2 | * | 4/2003 | Bautner | A01G 9/0295 |
| | | | | 47/77 |
| 2010/0192461 A1 | * | 8/2010 | Shieh | A01G 9/0297 |
| | | | | 47/65.9 |

FOREIGN PATENT DOCUMENTS

| | | | | |
|---|---|---|---|---|
| EP | 0585993 A1 | | 3/1994 | |
| FR | 2210341 A1 | * | 7/1974 | .......... A01G 9/0295 |
| FR | 2630882 A1 | * | 11/1989 | ............ A01G 9/086 |
| FR | 2630882 A1 | | 11/1989 | |
| NL | 7317203 A | | 6/1974 | |
| NL | 1021463 C2 | * | 3/2004 | ............... A01G 2/30 |
| WO | WO-0000014 A2 | * | 1/2000 | ............. A01G 22/35 |

* cited by examiner

CONTAINER, SUCH AS A TRAY OR STRIP, WITH CUTTING EDGES

This is a national stage application filed under 35 U.S.C. § 371 of pending international application PCT/NL2019/050034, filed Jan. 22, 2019, which claims priority to Netherlands Patent Application No. NL 2020300, filed Jan. 22, 2018, the entirety of which applications are hereby incorporated by reference herein.

The present disclosure relates to a container, such as a pot, strip or tray, comprising at least one accommodation for at least one specimen from a group, at least comprising: plants; seeds; seedlings; cuttings and the like, wherein the accommodation is to be filled with a substrate and exhibits at least a side wall, a bottom and a top surface to accommodate the substrate and the specimen in the substrate. At least a portion of the top surface is open to enable growth of the specimen there through in a longitudinal direction.

Such containers are known from NL-73 17 203 and/or EP-0 585 993. These publications relate to trays, in which plant positions are defined which are filled with substrate. The substrate may be cut by the container and in particular a cutting edge demarcating or surrounding an opening in the open top surface. Due to the consideration that such trays may be turned upside down, the disclosures of these acknowledged prior an publications relate to inserting and/or extracting substrate exclusively in the longitudinal direction.

Accommodations of containers may be filled by cutting of portions of substrate, such as oasis floral foam, with the container and inserting the cut portions of substrate into accommodations, which avoids a risk of incorrect sizes of the cut portions of substrate and requires less labour and/or machinery to implement.

However, as a disadvantage of the prior art containers, survival rate of specimens is low and large numbers of specimens are lost, for example after extraction of the substrate and the specimen grown therein for transplantation into larger containers for further growing of the specimens.

The present disclosure is directed at alleviating or even resolving problems of the prior art and provide an improvement, wherein of said side wall comprises a completely open passage. which is dimensioned for inserting or extracting a block of substrate with essentially a full size of an interior of the accommodation into or from the interior through the passage in a sideways direction relative to the longitudinal direction, wherein at least the side wall comprises a cutting edge alongside the passage.

Additionally, the bottom may comprise a further cutting edge.

Additionally or alternatively the open portion of the top surface and the passage may together define an extended passage, which is shaped and dimensioned for inserting and/or extracting the block of substrate and the specimen extending in the longitudinal direction from the substrate into and/or from the interior through the extended passage in a sideways direction relative to the longitudinal direction.

The present disclosure consequently allows for cutting and introducing the substrate in a sideways direction, and after initial growing of the specimen also extraction of the substrate with the grown specimen in the same or further sideways direction As a result, substrate is cut to size, and introduced through the passage into the accommodation in a single flowing, sideways oriented step, without risk of a mismatch in size of cut substrate relative to the interior of the accommodation. The substrate is preferably a rigid or brittle material, such as floral foam, known under the brand or product name "oasis", and cut portions of the substrate are clamped in the accommodation of the containers reliably, which prevents the portions of substrate from inadvertently falling sideways out of the accommodation of the containers, for example during initial growth of the specimen. To enhance inclusion of the cut portion of substrate in the accommodation of the containers, the top surface may be partially covered, while leaving open a portion of the top of the substrate for the specimen to grow through, to prevent cut blocks of substrate from skewing or tilting in the accommodation of the containers, and limiting inserting and extraction movements to purely linear sideways transport.

According to the present disclosure, the combined functionalities of cutting the substrate to perfect size, and consequently clamping or form fitting the cut substrate in the accommodation while allowing extraction of the substrate with a grown or growing specimen in the sideways direction to minimize contact between the specimen and parts and portions of the container or a gripping, extracting tool, such as a robot gripper, has proven to considerably enhance the survival rate of the specimens. It is noted that a plate or strip of substrate may even have pre-grown Following the above general indication of the core of the present disclosure, it is noted that many non-limiting but preferred embodiments are possible within the scope of the present disclosure, which are set out or apparent from the below embodiment description, and/or defined in the appended dependent claims.

In a possible embodiment the cutting edge is sharpened. Preferably, the cutting edge is sufficiently sharpened to cut at least one essentially accommodation sized block from the substrate when pressed into the substrate, or vice versa. This is to say that the container's cutting edge may be pressed into the substrate to cut accommodation sized portions thereof, or that the substrate can be pressed into the accommodation to be cut to size by the cutting edge.

The substrate may comprise at least one material from a group at least comprising oasis floral foam, rock or glass wool, peat, coco.

A material of the container may be bio-degradable.

The container may comprise a plurality of plant accommodations, wherein pairs of accommodations are linked via a breakable or tearable connection.

The container may be in the form of a cutter tray, wherein cutting edges are defined on posts. Then the posts may be arranged at a distance. The posts may define a through passage for essentially accommodation sized blocks of substrate to pass through the passages. Such a tray like container may further comprise a receptacle tray.

All combinations of above mentioned and below described preferred features of the container are also encompassed within the scope of the present disclosure.

Additionally, the present disclosure also relates to an assembly of a container and at least one essentially accommodation sized block of substrate, which is cut to essentially the size of the accommodation.

Further, the present disclosure relates to a method of processing a container according to the present disclosure, by providing the container, pressing the container and more in particular the cutting edge into substrate or vice versa, and thereby cutting the substrate into at least one essentially accommodation sized block through the passage.

Further, the present disclosure relates to a method of growing a specimen from a group, at least comprising: plants; seeds; seedlings; cuttings and the like, in an accommodation of the container in an assembly according to the present disclosure with the container and the substrate, comprising: providing the specimen at a specimen origin; assembling the container and the essentially accommodation sized blocks of substrate at the specimen origin; planting the specimen in the substrate; allowing roots of the specimen to develop. This allows the containers to be used for transport from the origin to the destination with the specimens in substrate.

Preferably, this embodiment of a method further comprises subsequently transporting the assembly with the planted and rooting or rooted specimen from the specimen origin to a destination.

An alternative method of growing a plurality of specimens from a group, at least comprising: plants; seeds; seedlings; cuttings and the like, in accommodations of the container in an assembly according to the present disclosure, with the container comprising a plurality of accommodations and a plurality of essentially accommodation sized blocks of substrate, the method comprises: providing the specimens; assembling the container and the blocks of substrate; planting the specimens in the blocks of substrate; allowing roots of the specimens to develop; determining which of the specimens are viable; and exchanging viable or unviable specimens with associated blocks of substrate for respectively unviable or viable specimens with associated blocks of substrate from another container.

Any of the aforementioned methods may further comprise generating at least one of an air flow, a fluid flow and ultrasound waves. This may contribute to release of blocks of substrate from accommodations and/or cleaning the container. This embodiment of the method may comprise using at least one nozzle, at least generally directed at an accommodation at a time. Additionally or alternatively, the method may further comprise transporting the container through or along the at least one of an air flow, a fluid flow and ultrasound waves. When doing so, the method may further comprise generating multiple of the at least one of an air flow, a fluid flow and ultrasound waves from at least one of: opposing sides relative to a transport direction of the container; and different locations along the transport direction of the container.

Following the above indication of features of the present disclosure in terms and expressions of the appended claims, below an embodiment description is provided with reference to the appended drawing with figures of preferred and non-limiting embodiments. Therein:

Figure 1:
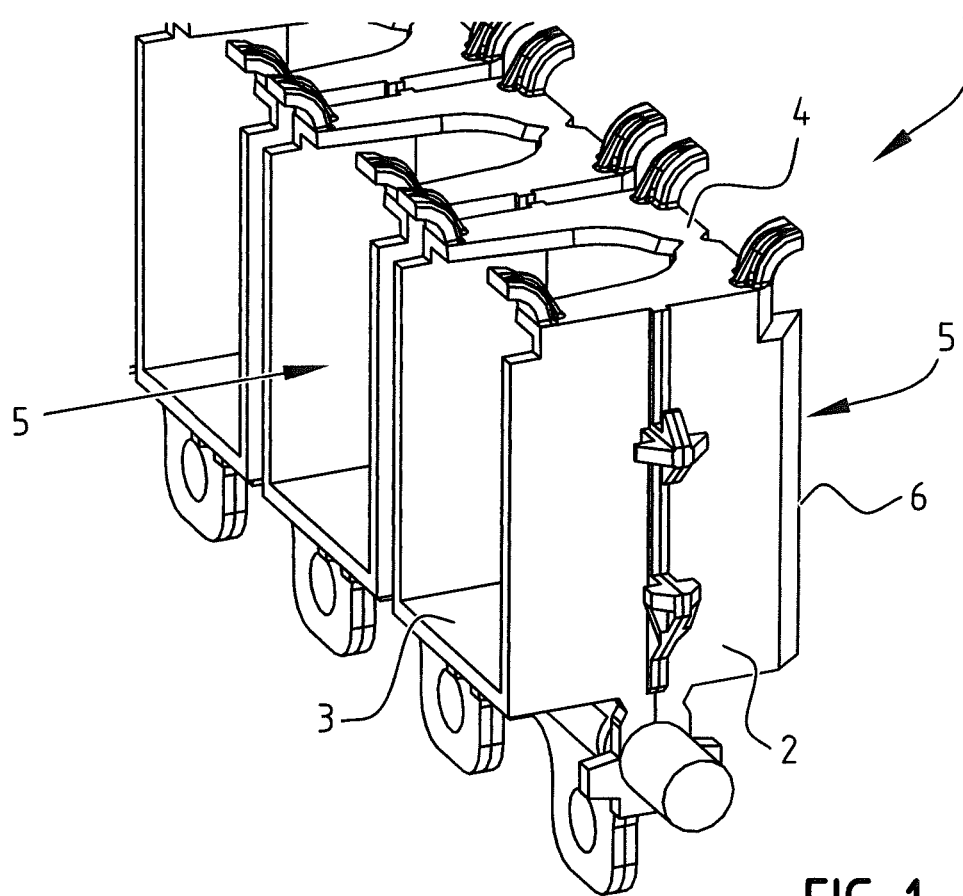
FIGS. 1 and 2 show embodiments of a container in the form of a strip of a plurality of plant accommodations.
Figure 2:
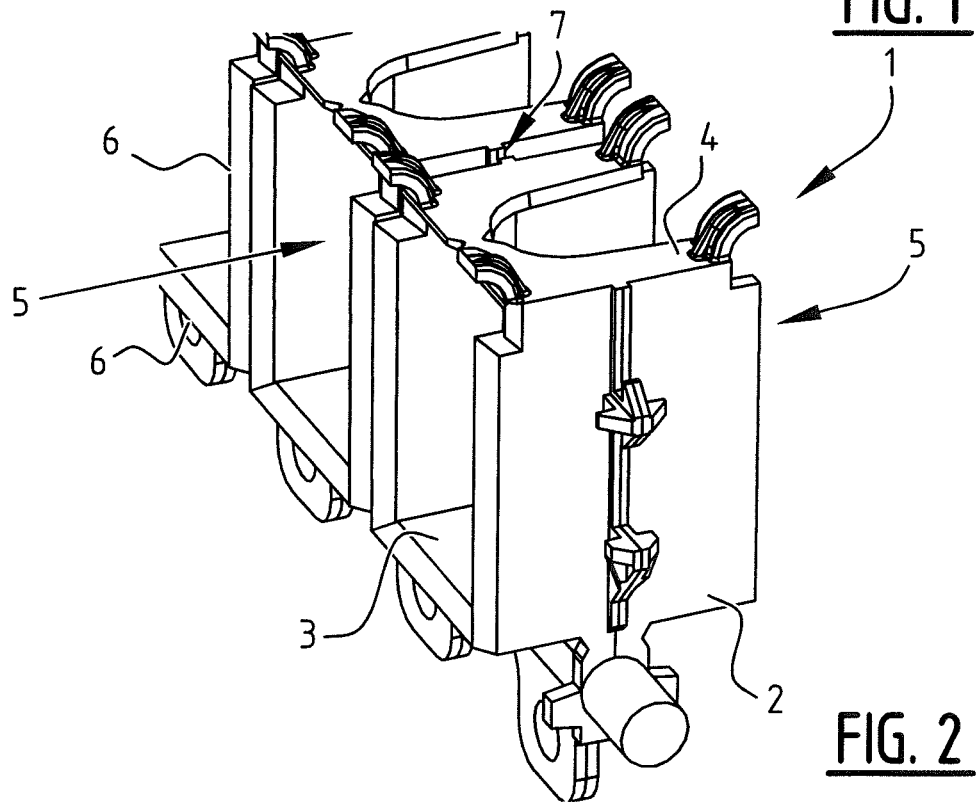
Figure 4:
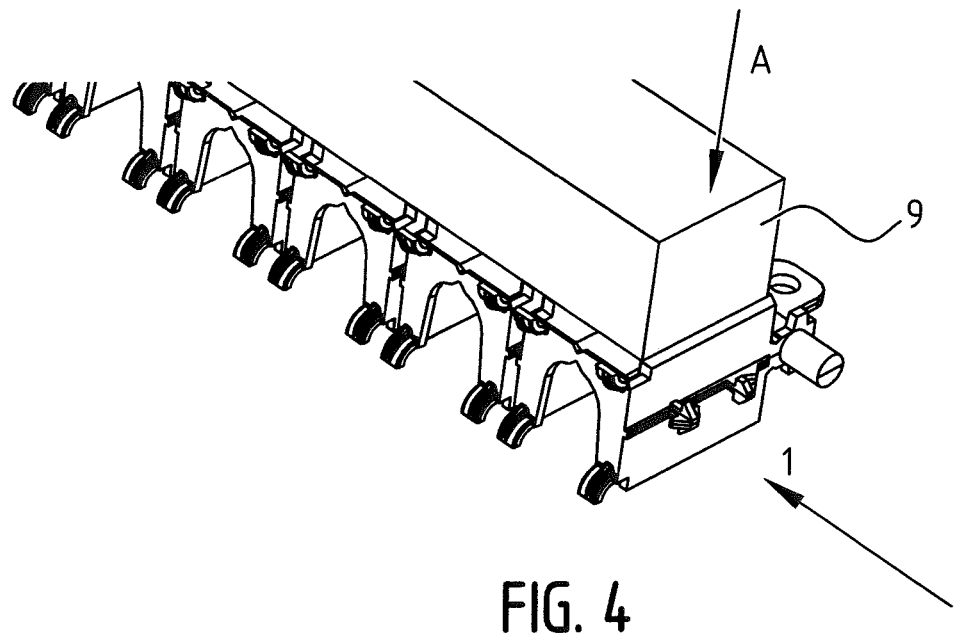
Figure 5:
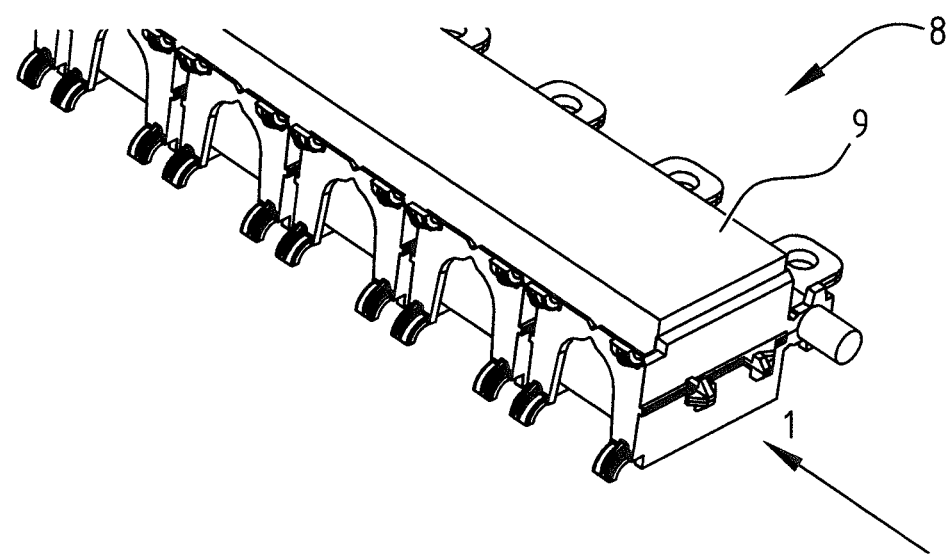
Figure 6:
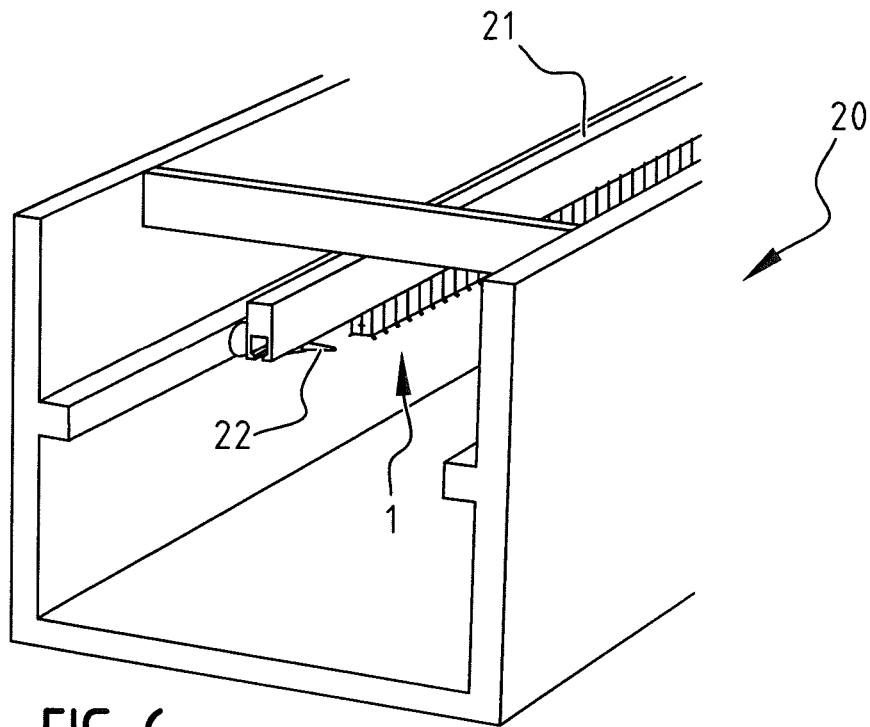
Figure 7:
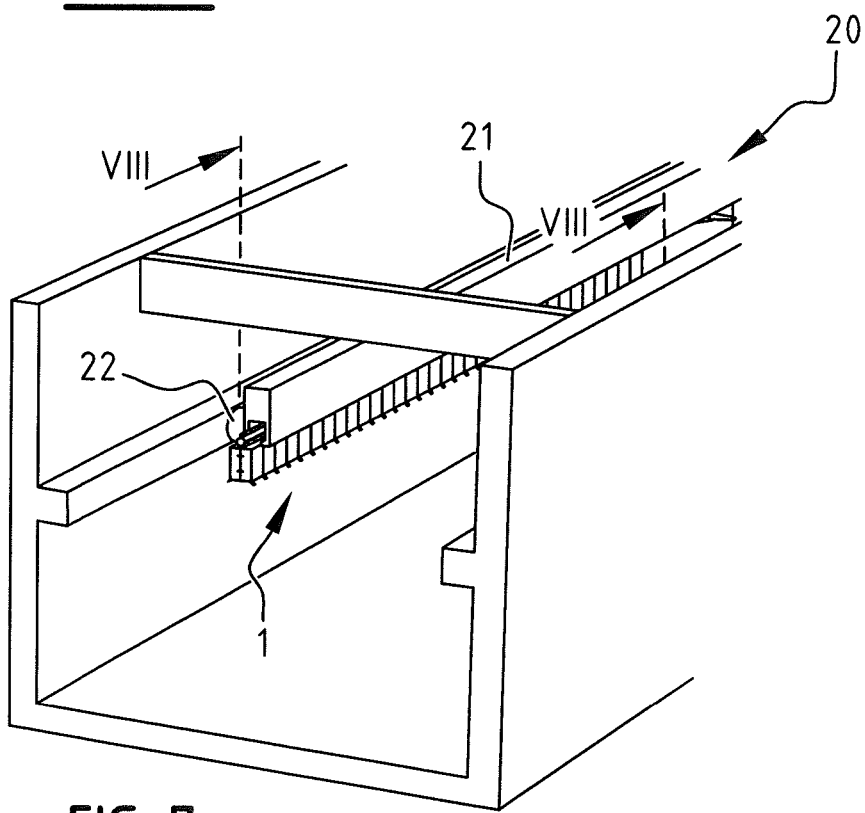
Figure 8:
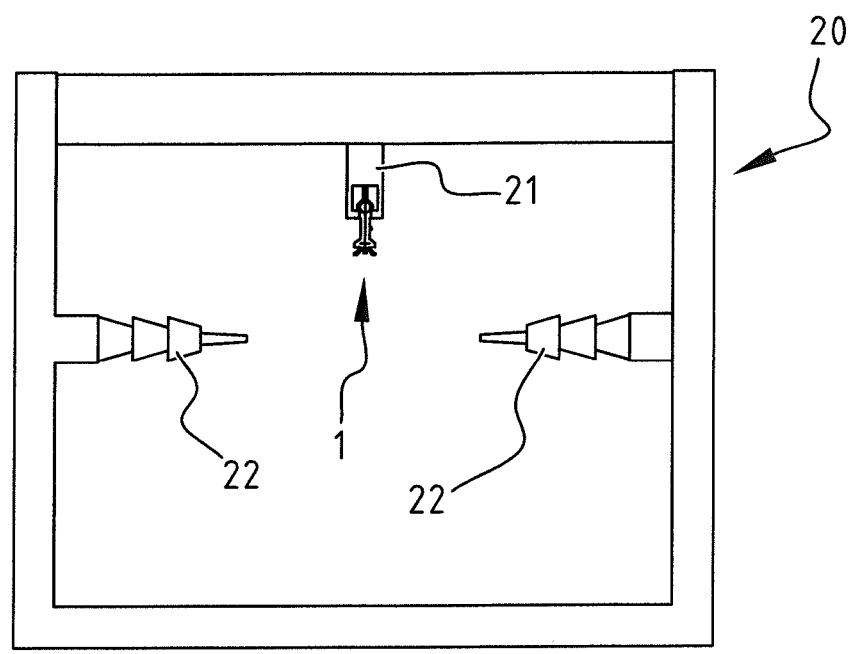

FIGS. 4 and 5 illustrate a method or process of simultaneously inserting substrate into plant accommodations of the strip like container of FIGS. 1 and 2, while cutting the substrate to size of the plant accommodations; and FIGS. 6, 7, and 8 illustrate embodiments of a system for processing strip shaped containers according to the present disclosure.

FIGS. 1 and 2 show augmenting views from different perspectives of a container in the form of a strip 1 of a plurality of plant accommodations. Alternatively, the container could be formed by a pot with a single accommodation, or by a tray with multiple parallel rows of accommodations. Each accommodation in use contains a volume of substrate to support at least one or more than one specimen. Specimens are plant material, such as plants, seeds, seedlings, cuttings and the like. To support such specimens, the accommodations are in use filled with a substrate and the specimens are planted in the substrate in the accommodations.

Each accommodation is defined by at least one of a side wall 2, a bottom 3 and top 4 covering at least a portion of a top surface of the accommodation, to accommodate the substrate and the specimen. Neighbouring accommodations may have a common side wall 2. One side wall at reference sign 5 is completely open. Additionally, the bottom 3 or top surface having top 4 can be completely open. The open side defines a passage for inserting or extracting a block of substrate with essentially a full size of an interior of the accommodation into or from the interior there through. This is explained in more detail below under reference to FIGS. 4 and 5.

At least one of the side wall 2, and optionally also bottom 3 comprises a cutting edge 6 alongside the passage. This allows substrate to be cut to the size of the interior of the accommodation, at the same time as inserting the substrate into the accommodation.

The cutting edge 6 is sharpened. It is noted here that the cutting edge seems sharp in FIG. 1 and blunt in FIG. 2, but that is a result of the perspective of the view. The cutting edge is sharpened also in FIG. 2. In more detail, the cutting edge 6 is sufficiently sharpened to cut at least one accommodation sized block from the substrate when pressed into the substrate, or vice versa (when the substrate is pressed into the accommodations of the strip 1, as described below in relation to FIGS. 4 and 5).

Pairs of neighbouring accommodations are linked via a breakable or tearable connection 7. When accommodations of the strip 1 (or pot/tray) are filled with substrate and plans develop roots from seeds, cuttings and the like, in the substrate, the accommodations may be singularized by breaking the connections 7 and planted in larger locations, such as plant pots.

For example, cuttings are taken from plants at a cutting origin, for example in Africa. Previously, these would have been transported in a bag or the like to a destination, for example in Europe or America, with a large loss in terms of dead cuttings as a result of the lack of substrate support. The longer the cuttings are in transport, the higher the mortality rate. By planting the cuttings (or seeds, seedlings etc) in the substrate and in the container of the present disclosure, and transporting these to the destination, the success rate of transport of viable plants is increased. Optionally, at the destination, the accommodations may then be singularised, and if material of the container is bio-degradable, the singularized accommodations may be planted in larger destination locations, such as plant pots, with the substrate and the developing plant. If the material of the container is not-biodegradable, substrate or only the plants may be transferred to new destination locations. In transport, young plants and in particular roots thereof may continue to develop.

The substrate 8 may comprise at least one material from a group at least comprising oasis floral foam, rock or glass wool, peat, coco. In particular floral foam materials, like Oasis, can be cut to size, and wedged clamped or form fit in the accommodation. With or without the specimen extending from a top surface of the substrate, the block of substrate may be inserted into or extracted from the accommodation in a sideways orientation and direction, relative to a longitudinal growing direction of the specimens in or on the block of substrate.

The present disclosure also relates to an assembly 8 of a container 1 of the present disclosure and at least one essentially accommodation sized block of substrate 9, which is cut with the cutting edge to essentially the size of the accommodation. The underlying method is illustrated in FIGS. 4 and 5, and comprises providing the container 1, and pressing the container and more in particular the cutting edge 6 into substrate 9 in the direction of arrow A or vice versa. Thereby, the substrate 9 is cut with the cutting edge 6 into at least one essentially accommodation sized block as it passes into/through through the passage.

Figure 3:
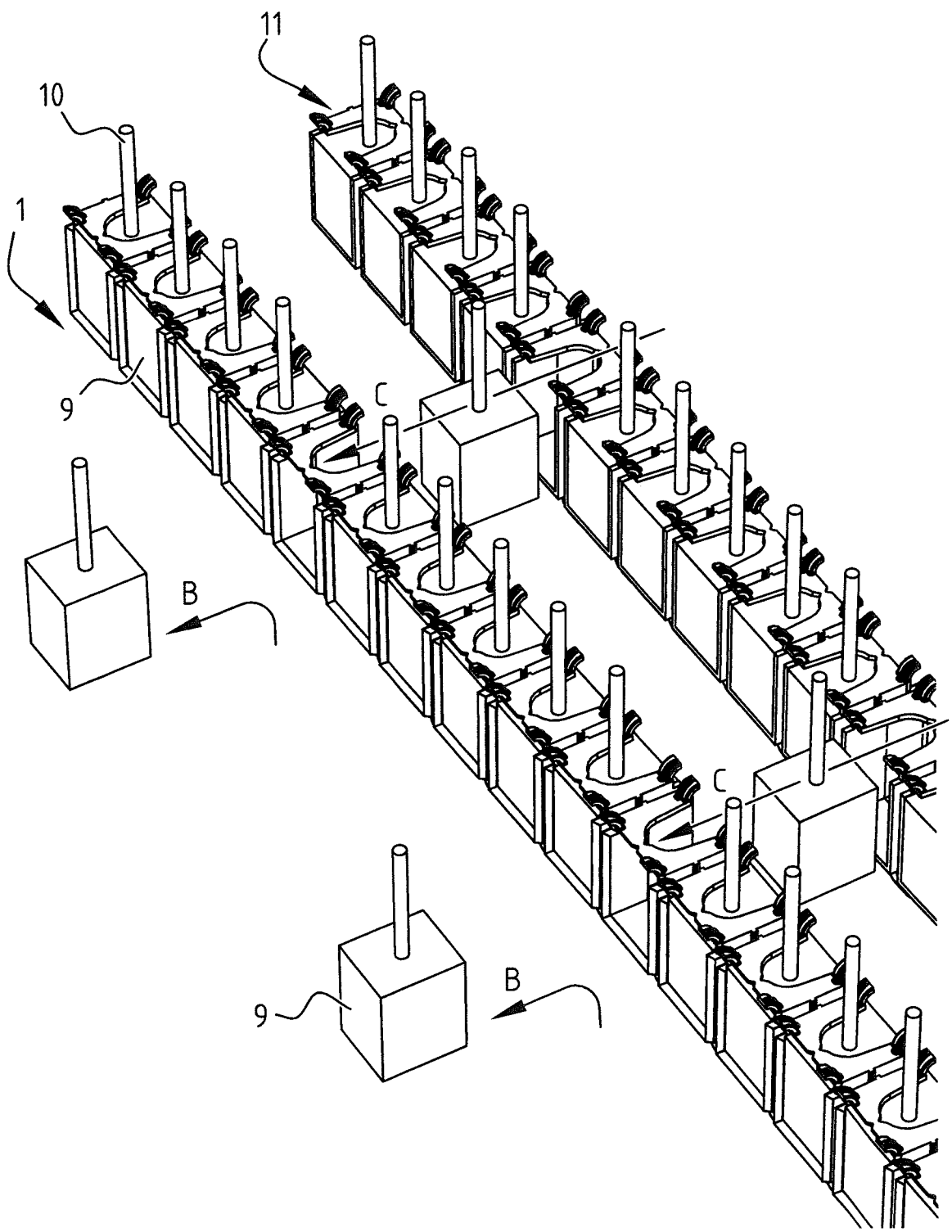
FIG. 3 illustrates a method or process according to the present disclosure.

The present disclosure further relates to another aspect of a method of growing a plurality of specimens. The specimens may be plants, seeds, seedlings, cuttings and the like. Specimens are grown in accommodations of the container 1/assembly 1, 9 of the present disclosure. The container 1 comprises a plurality of accommodations and a plurality of essentially accommodation sized blocks of substrate 9 in the accommodations. The method then entails that specimens 10 are supplied or provided and before hand or at the same time or thereafter, the container 1 and the blocks of substrate 9 are assembled, for example based on the illustration of FIGS. 4 and 5. Beforehand or thereafter, the specimens are planted in the blocks of substrate 9 and roots of the specimens 10 are allowed to develop for a predetermined time at the origin or in transport. After this time at the origin or in transport, it is determined which of the specimens are viable. In the embodiment of FIG. 3, unviable specimens 10 with associated blocks of substrate 9 are exchanged for viable specimens with associated blocks of substrate from another container 11. To this end unviable specimens 10 and their associated blocks of substrate 9 are ejected from the strip 1 in the sideways direction of arrows B and viable specimens are taken also in a sideways direction from the other strip 11 and inserted into the first strip 1 in the direction of arrows C. Unviable specimens 10 from strip 1 may be inserted into the other strip 1 or discarded.

FIGS. 6-8 illustrate a system 20 for processing containers according to the present disclosure, for example strips 1 of FIGS. 1-5. Strips 1 are suspended from a rail 21. From at least one side, and preferably two sides, and further also from different positions along the length of rail 21, at least one nozzle 22 is directed generally on positions below the rail 21, and potentially even below the strips 1 passing above. The at least one nozzle 22 may be oriented to a desired position relative to the rail 21, for example depending on sizes of strips passing through the system 20. The at least one nozzle 22 may generate at least one of an air or fluid flow, or even ultrasonic waves. Thereby substrate blocks in accommodations of strip 1 may be extracted from the accommodations. Alternatively, the at least one nozzle may serve to clean strip 1, and for example blow or flush residues of substrate from the strip 1, after substrate blocks are extracted from the accommodations of the strip 1 together with plant material, for example after having developed roots in the substrate blocks for a predetermined period.

As shown in FIG. 8, nozzles 22 are arranged opposite the rail 21 and oriented in the general direction of strip 1, preferably at the strip 1, but in the here shown embodiment at a height below the strip 1, which is suspended from rail 21. A wash, resulting from colliding fluid or air flows or ultrasonic waves from the opposing nozzles 22, can develop flushing or cleaning force in an upward direction up to the strip 1, to a sufficient extent to extract substrate blocks and/or clean strip 1, and prevent any damage to the strip 1, since the impact is indirect. However, by appropriate setting of the force generated by nozzles 22 when oriented directly at strip 1, such damage can already be adequately prevented.

Above aspects of the present disclosure have been described, where the scope of the present disclosure is by no means limited to any preferred aspect or feature, but only by the limiting definitions of the appended independent claims, and may include in particular jurisdictions also obvious alternatives.

The invention claimed is:

1. A container in the form of a strip comprising at least one accommodation for at least one specimen from a group, the container comprising:
    plants; seeds; seedlings; or cuttings,
    wherein the at least one accommodation is configured to be filled with a substrate and wherein the container comprises at least a side wall, a bottom and a top covering at least a portion of a top surface of the at least one accommodation to accommodate the substrate and the specimen in the substrate, wherein at least a portion of the top surface is open to enable growth of the specimen there through in a longitudinal direction,
    wherein the side wall comprises a completely open passage which is dimensioned for inserting a block of the substrate with essentially a full size of an interior of an accommodation of the at least one accommodation into the interior through the passage in a sideways direction relative to the longitudinal direction;
    wherein at least the side wall comprises a cutting edge alongside the passage;
    wherein the cutting edge is sufficiently sharpened to cut at least one accommodation sized block from the substrate when pressed into the substrate;
    the container further comprising a plurality of plant accommodations, wherein pairs of said accommodations are linked via a breakable or tearable connection that allow said accommodations to be singularized.

2. The container of claim 1, wherein the bottom comprises a further cutting edge.

3. The container of claim 1, wherein the open portion of the top surface and the passage together define an extended passage which is shaped and dimensioned for inserting and/or extracting the block of substrate and the specimen extending in the longitudinal direction from the substrate into and/or from the interior through the extended passage in the sideways direction relative to the longitudinal direction.

4. The container of claim 1, wherein a material of the container is bio-degradable.

5. The container of claim 1, wherein the breakable or tearable connection of a given pair of said accommodations connects the side walls of those accommodations.

6. A method of processing the container of claim 1, comprising:
    providing the container;
    pressing the container with the cutting edge into the substrate, to thereby cut the substrate with the cutting edge into at least one essentially accommodation sized block of the substrate through the passage.

7. The method of claim 6, further comprising generating at least one of an air flow, a fluid flow and ultrasound waves.

8. The method of claim 7, comprising using at least one nozzle, at least generally directed at an accommodation of the at least one accommodation at a time.

9. A method of growing a specimen from a group, at least comprising: plants; seeds; seedlings; and cuttings, in the accommodation of the container according to claim 1, in which at least one essentially accommodation sized block of the substrate is cut to essentially the size of the accommodation, the method comprising:
    providing the specimen at a specimen origin;

assembling the container and the essentially accommodation sized blocks of substrate at the specimen origin;
planting the specimen in the substrate; and
allowing roots of the specimen to develop.

10. The method of claim 9, further comprising subsequently transporting the assembly with the planted and rooting or rooted specimen from the specimen origin to a destination.

11. A method of growing a plurality of specimens from a group, at least comprising: plants; seeds; seedlings; and cuttings, in blocks of the substrate in at least one accommodation of the container of claim 1, with the container comprising a plurality of accommodations and a plurality of essentially accommodation sized blocks of the substrate therein, the method comprising:
providing the specimens;
assembling the container and the blocks of the substrate;
planting the specimens in the blocks of the substrate;
allowing roots of the specimens to develop;
determining which of the specimens are viable;
ejecting unviable specimens from the container, and
exchanging the unviable specimens and associated blocks of the substrate through the completely open, accommodation sized passage in the side wall in the sideways direction for viable specimens and associated blocks of substrate from another container.

12. The method of claim 11, further comprising arranging the container and the another container with the completely open, accommodation sized passage in the side wall of the accommodations thereof facing each other.

13. The method of claim 12, wherein the viable specimens and associated blocks of the substrate from the another container are moved in a linear direction to replace unviable specimens in the container.

* * * * *